J. MILLER.
RECORD KEEPER.
APPLICATION FILED MAY 27, 1912.
1,070,906.
Patented Aug. 19, 1913.
3 SHEETS—SHEET 1.
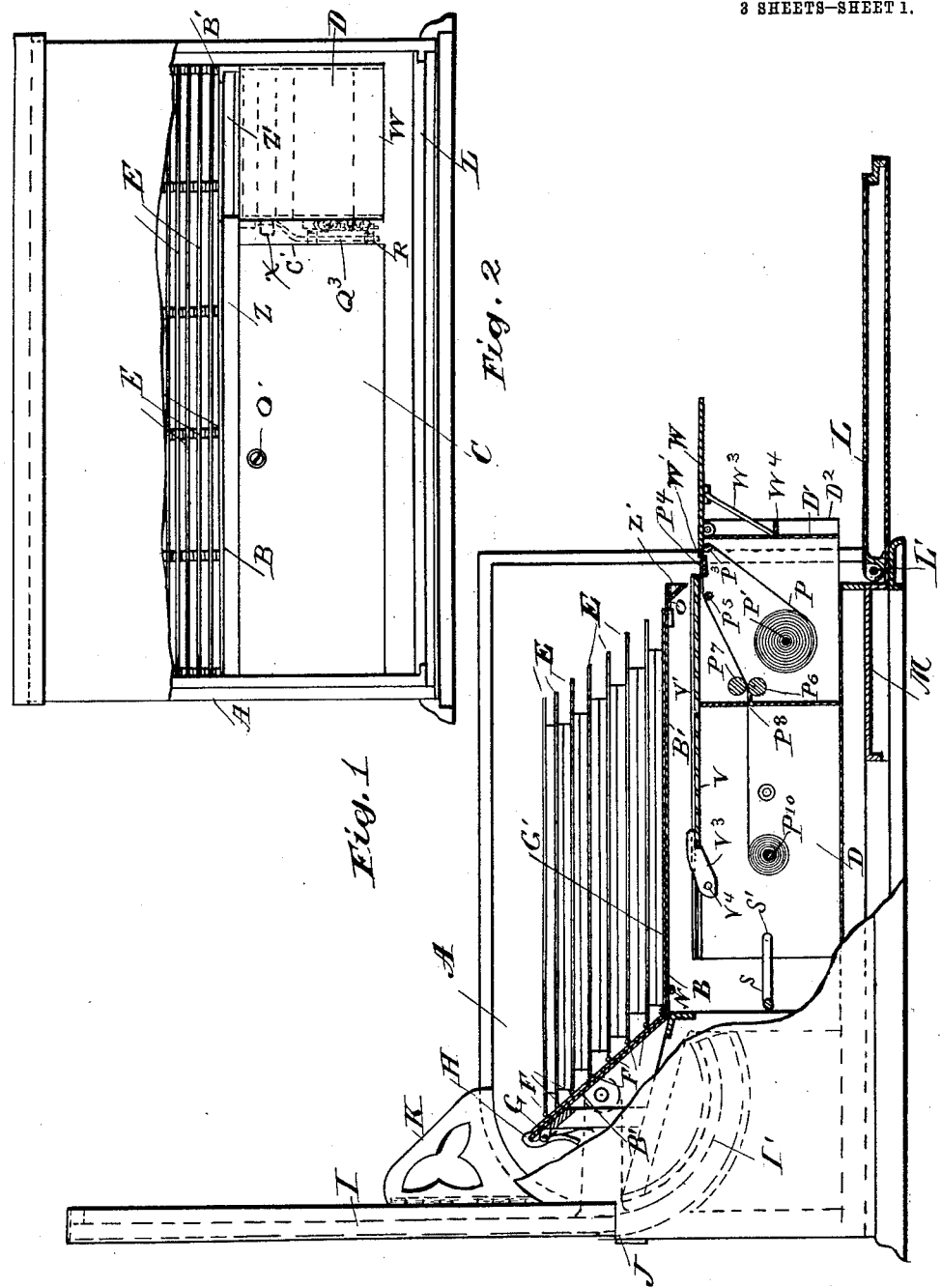

J. MILLER.
RECORD KEEPER.
APPLICATION FILED MAY 27, 1912.
1,070,906.
Patented Aug. 19, 1913.
3 SHEETS—SHEET 2.
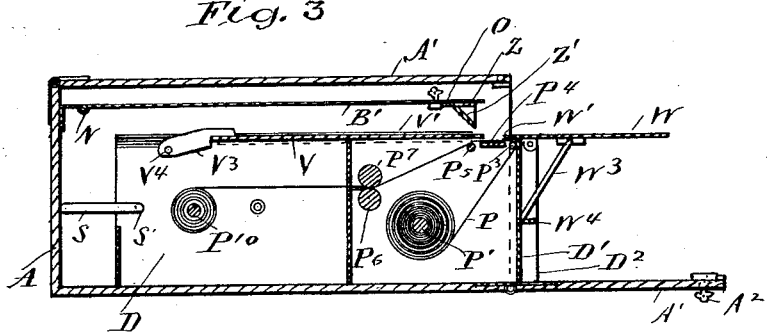
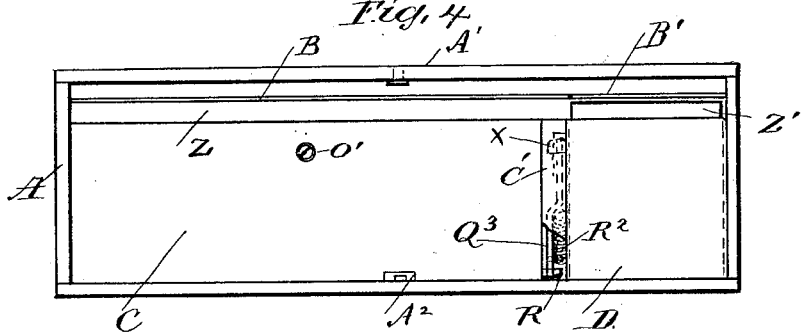
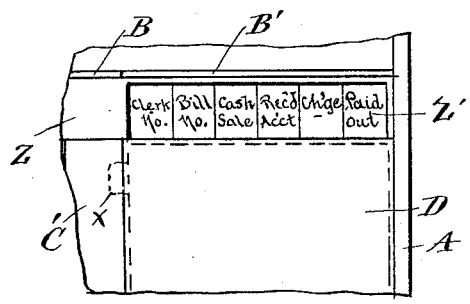
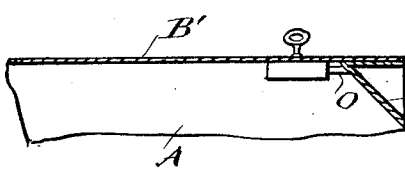
Witnesses
P. Bredel
Geo. S. Cole
Inventor
Joseph Miller
by Wm. M. Monroe
Attorney J. MILLER.
RECORD KEEPER.
APPLICATION FILED MAY 27, 1912.
1,070,906.
Patented Aug. 19, 1913.
3 SHEETS—SHEET 3.
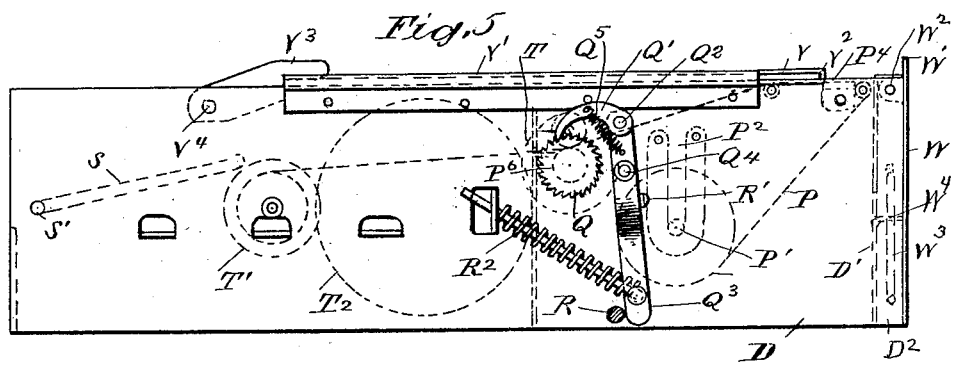
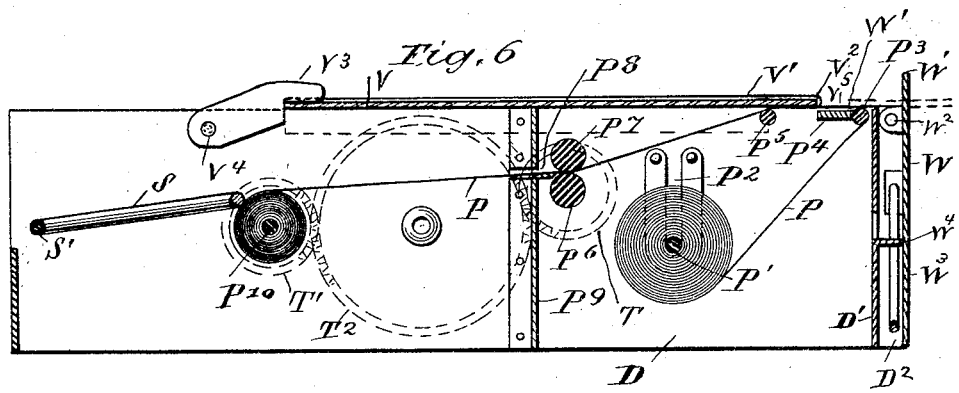
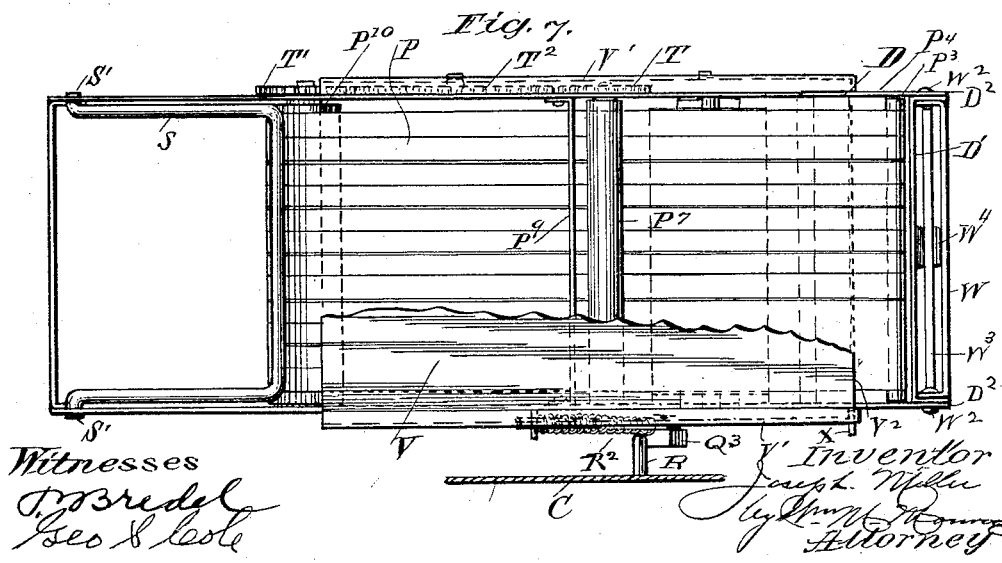

UNITED STATES PATENT OFFICE.

JOSEPH MILLER, OF CLEVELAND, OHIO, ASSIGNOR TO THE CHAMPION REGISTER COMPANY, OF CLEVELAND, OHIO, A CORPORATION OF OHIO.

RECORD-KEEPER.

1,070,906.     Specification of Letters Patent.     Patented Aug. 19, 1913.

Application filed May 27, 1912. Serial No. 700,104.

*To all whom it may concern:*

Be it known that I, JOSEPH MILLER, a citizen of the United States, and resident of Cleveland, in the county of Cuyahoga and State of Ohio, have invented certain new and useful Improvements in Record-Keepers, of which I hereby declare the following to be a full, clear, and exact description, such as will enable others skilled in the art to which it appertains to make and use the same.

The objects of the invention are to provide a record keeper for items of daily business of all kinds, and the invention includes a sheet upon which records are made, a case in which the record sheet is mounted, and an outer case therefor, which may be a cabinet for sales slips or other records, or any other sort of case, and in which is also inclosed a cash drawer.

In the improved form of recording device the movements of the recording sheet are controlled by the forward movements of the cash drawer so that when the cash drawer is opened a fresh space on the record sheet is presented to the operator for a new entry.

The invention also comprises the combination and arrangement of parts and construction of details hereinafter described, shown in the accompanying drawings and specifically pointed out in the claims.

In the accompanying drawings Figure 1 is a longitudinal vertical section through the record inclosing cabinet and record case; Fig. 2 is a front elevation of the device showing a portion of the front wall removed to disclose the cash drawer and record case; Fig. 3 is a longitudinal vertical section of the record case inclosed in an ordinary box or outer case having a horizontal plate above the record case; Fig. 4 is a front elevation thereof; Fig. 4ª is a front elevation enlarged of the rail upon which the divisions of the record sheet are disclosed to assist the operator in making his entries; Fig. 4ᵇ is a longitudinal section of the cover for the inclosure in which the record case is placed showing a locking means therefor; Fig. 5 is a side elevation of the record case; Fig. 6 is a longitudinal section thereof; Fig. 7 is a plan view thereof.

In these views A is the cabinet which is provided with a horizontal plate B arranged intermediate of its top and bottom, to provide an inclosure below for a cash drawer C and a record sheet inclosing case D which may be called hereinafter a record case.

Above the platform B are arranged the metallic leaves E, E to which record slips are attached in the usual manner. These leaves are hinged at F, F to a plate G which rests upon an inclined portion B′ of the plate B and the plate G is hinged in turn to a horizontal plate G′ which rests upon the plate B. The leaves E, E are lifted one at a time to attach the paper slips or read them as desired. A hook H secures the leaf bearing plate G to the incline B′.

To facilitate opening the cabinet widely a cover I having a curved rear portion I′ can be raised to a vertical position by sliding the curved rear portion downward into the case at J and hinged supports K retain it in the vertical position to disclose the leaves for use. The front of the case is open and is closed by means of a cover L hinged at L′ to a horizontal portion M slidable back into the case.

The portion B′ of the plate B over the record case is hinged at N so that it can be lifted up to put a new sheet in the record case and is fastened by the owner by means of a bolt shown at O so that he only can have access to the record sheet. The cash drawer is locked at O′.

A vertical post C′ separates the front ends of the cash drawer and record case, and a stop X limits the outward movements of the record case.

The cash drawer can be freely drawn out of the case when unlocked, but the record case is not designed to be moved farther forward than is necessary to make an entry upon the record sheet and is returned every night within the cabinet.

The construction and mode of operation of the recording devices are distinctly shown in Figs. 5, 6, and 7 and may be described as follows: P is the record sheet properly ruled longitudinally for the required divisions for the accounts of a credit business, such as no. of clerk, no. of bill, cash sale, account charge, paid out, etc. varying with the class of business in which the record sheet is employed. P' is a roller in the interior of the case on which the sheet is wound and is detachably secured in a spring socket P². From this roller the sheet passes over a guide roller P³ at the front of the case and thence over a flat strip or narrow platform P⁴ extending transversely across the upper part of the case, and upon this platform the record is entered by the clerk. Thence the sheet passes over a second guide roller P⁵ at the same level as the first guide roller and is drawn between two oppositely moving upper and lower rollers P⁶ and P⁷ preferably covered with rubber to obtain the necessary adhesion, and thence through a guide opening or slot P⁸ in a partition wall P⁹ to keep the sheet in line and is finally wound upon a removable roll P¹⁰ from which it can be removed by the owner for inspection whenever desired.

The record sheet is automatically operated to move forward one space at a time by means of a pawl and ratchet device the movements of which are controlled by the movement of the cash drawer.

A ratchet wheel Q is mounted upon the lower friction roller P⁶ exterior to the case ratchet is engaged by a pawl Q' pivoted at Q² to a lever Q³ which projects from the case and is pivoted thereto at Q⁴. A spring Q⁵ retains the pawl in contact with the teeth of the ratchet wheel. This pawl rotates the ratchet wheel to move the record sheet one space at a time over the platform P⁴.

The lever Q³ is operated by means of the lug or pin R projecting from one side of the cash drawer as the drawer is pulled out, and this pin may if desired serve to draw out the record case the required distance. The lever Q³ is prevented by means of the stop R' from being forced forward farther than the distance required to form the necessary space. A spring R² returns the lever and draws back the pawl when released by the cash drawer.

When the record case is drawn out a bar S pivoted at S' to the rear of the case is folded backward as seen in Fig. 1 and prevents the record case from being put back into the case by any one not having the key and it is intended that the record case shall stay out until the day's business has been recorded. This member S is also intended to lie upon the roll of paper on the roller P¹⁰ to keep it smooth and under pressure until the device is used again.

The driving rolls P⁶ and P⁷ and the roller P¹⁰ on which the sheet is wound move at exactly the same rate of speed and the roll P¹⁰ is operatively connected with the roll P⁶ by means of spur gears T and T' of equal size, and the intermediate idler T² which may be of any size sufficient to permit it to intermesh with the other two gears.

The case is preferably covered with a glass plate V movable in guides V' in the upper edges of the case and the forward edge just covers the inner edge of the platform P⁴ and forms one margin V² for the space upon the record sheet. A hasp V³ pivoted in the case serves to detachably secure the glass in place.

The other margin of the entry space on the record sheet is formed when the case is drawn out as shown in Fig. 1 by means of the edge W' of a plate W which is pivoted to the front wall D' of the case at W² and when the plate is elevated to a horizontal position as shown in Fig. 1 and in dotted lines in Fig. 4 it serves as a rest for the hand of the operator while writing in the opening V³ formed between the margins V² and W'.

The plate W is retained in its elevated position by means of a brace rod W³ the lower end of which rests upon the bracket W⁴ formed in the front wall of the case.

The sides of the case project at D², D² so as to form a recess inclosing the brace rod W³ and when folded down the plate W covers this recess.

In Figs. 3 and 4 an ordinary outer box or case A is shown having cover portions A', A², to illustrate the wide range of usefulness to which the invention is adapted.

Having described the invention what I claim as new and desire to secure by Letters Patent is:

1. The combination with an outer case, of a cash drawer and a case for a recording sheet arranged side by side, and slidable in said outer case, supporting, guiding, and feeding means for said record sheet, a platform at the front of the record sheet over which said sheet travels, a rotatable ratchet wheel, and pawl and lever pivoted exterior to the record case, for operating said feeding means, a projection on said cash drawer located behind said lever and adapted to engage and operate said lever when the cash drawer is pulled out, means for limiting the forward movement of the record case when the said platform is exposed to view outside of the outer case, and a movable plate pivoted to the sides of said record case at the forward and upper edges thereof, the inner end of said plate overlapping said platform and forming a marginal edge for one of the spaces of the record sheet, and the outer portion thereof forming a hand rest when said plate is placed in the horizontal position.

2. The combination with an outer case, of a cash drawer slidable in the outer case, an adjoining record case having a limited movement, and slidable in said outer case, supporting means for a recording sheet in said record case, feeding means for said sheet actuated by said cash drawer when drawn out, an elevated platform in said record case over which said sheet travels and visible when said case is drawn out, a folding hand rest the inner edge of which overlaps said platform, a cover for the record case, the outer edge of which overlaps said platform, said edges forming the two margins of a recording opening, and means for supporting said folding plate.

3. The combination with an outer case, of a record case inclosing a recording sheet and slidable in said outer case, a cash drawer slidable in the said outer case, a hinged plate in said outer case over said record case and locking means therefor, a stop limiting the outward movement of said record case, and a member for preventing the return of said record case to the cabinet until said hinged plate has been released, an elevated platform in said record case over which said record sheet passes, and upon which it is visible when the case is drawn out, means in said case for supporting and feeding said record sheet, and means on said cash drawer for operating said feeding means when said cash drawer is drawn out of the case.

4. In a record case inclosing a recording sheet, in combination, a detachable roll in said case on which the sheet is stored, an elevated platform over which the said record sheet travels, a cover for the case having one edge overlapping said platform, and a folding plate pivoted adjacent to the other edge of said platform, said folding plate having one edge overlapping said platform when the folding plate is elevated to the horizontal position, the adjoining edges of said cover and folding plate providing margins for an opening through which an entry can be made upon said record sheet, and a support for said folding plate when placed horizontally.

5. The combination with an outer case, of a cash drawer slidable therein, a case for a record sheet, said record case having a limited forward movement in said outer case, an elevated platform in the forward extremity of said record case, over which said record sheet passes, means for operating said record sheet controlled by the forward movement of said cash drawer, means for preventing the return of said case, and a folding hand rest at the front end of said record case, and a stop limiting the forward movement of said record case.

6. The combination with a cabinet having an upper receptacle for inclosing record slips and a lower receptacle for a cash box and for a case for a recording sheet, of a horizontal partition separating said upper and lower receptacles, said partition having an opening, a cash drawer and record sheet case arranged side by side and slidable in the lower receptacle, the said case located underneath said opening and cover, a projection in the side of said cash box supporting and feeding means for a record sheet in said case, means in said case for operating said feeding means for said sheet in an intermittent manner, said operating means actuated by said projection on said cash box, when said cash box is pulled out of said cabinet, a platform over which said record sheet travels, when said case is pulled out of said cabinet, and means for limiting the outward movement of the case in the cabinet when the space of the record sheet upon said platform appears exterior to the case.

7. The combination with a cabinet having an upper and a lower compartment, the upper compartment adapted for storing records, of a cash drawer and a case for a recording sheet arranged side by side and slidable in said lower compartment, supporting, guiding and feeding means for said record sheet, a platform at the front of the case over which said sheet travels, a rotatable wheel pawl and lever pivoted exterior to the case for operating said feeding means, a projection on said cash drawer adapted to engage and operate said lever when the cash drawer is pulled out, means for limiting the forward movement of the case when the platform is exposed to view outside of the cabinet, and a movable plate pivoted to the sides of said case at the forward and upper edges thereof, the inner end of said plate overlapping said platform and forming a marginal edge for one of the spaces on the platform, and the outer portion thereof forming a hand rest when said plate is elevated to the horizontal position.

8. The combination with a cabinet having upper and lower compartments, the upper compartment for storing record slips, and the lower for a cash drawer and record case respectively, of a cash drawer slidable in the case, an adjoining record case having a limited movement, supporting means for a recording sheet in said case, feeding means therefor actuated by said cash drawer when drawn out, an elevated platform over which said sheet travels, and is visible when said case is drawn out, a folding hand rest the inner edge of which overlaps said platform, a cover, the outer edge of which overlaps said platform, said edges forming the margins of a recording opening, and means for supporting said folding plate.

9. The combination with a cabinet having upper and lower compartments, of a record case inclosing a recording sheet, a cash drawer slidable in the said lower compartment, and having an opening over said record case, a hinged plate in said opening and lock therefor, a stop limiting the outward movement of said record case, and hinged members for preventing the return of said record case to the cabinet until said hinged plate has been released, an elevated platform in said record case over which said record sheet passes, and upon which it is visible when the case is drawn out, means in said case for supporting and feeding said record sheet, and means in said cash drawer for operating said feeding means when said cash drawer is drawn out of the case.

In testimony whereof, I hereunto set my hand this 21st day of May 1912.

JOSEPH MILLER.

In presence of—
GEO. S. COLE,
WM. M. MONROE.